(12) United States Patent
Lewsley et al.

(10) Patent No.: US 10,959,408 B2
(45) Date of Patent: Mar. 30, 2021

(54) ANIMAL HALTER

(71) Applicant: DOGMATIC (UK) LTD, Telford (GB)

(72) Inventors: Susan Elaine Lewsley, Broughton (GB); Zoe Nichole Lewsley, Broughton (GB)

(73) Assignee: DOGMATIC (UK) LTD, Telford (GB)

( * ) Notice: Subject to any disclaimer, the term of this patent is extended or adjusted under 35 U.S.C. 154(b) by 146 days.

(21) Appl. No.: 15/523,029

(22) PCT Filed: Oct. 22, 2015

(86) PCT No.: PCT/GB2015/053160
§ 371 (c)(1),
(2) Date: Apr. 28, 2017

(87) PCT Pub. No.: WO2016/066996
PCT Pub. Date: May 6, 2016

(65) Prior Publication Data
US 2017/0311571 A1 Nov. 2, 2017

(30) Foreign Application Priority Data
Oct. 29, 2014 (GB) .................................... 1419207

(51) Int. Cl.
*A01K 25/00* (2006.01)
(52) U.S. Cl.
CPC .................................... *A01K 25/00* (2013.01)
(58) Field of Classification Search
CPC ............................ A01K 27/002; A01K 25/00
USPC .................. 119/821, 831, 832, 856
See application file for complete search history.

(56) References Cited

U.S. PATENT DOCUMENTS

| 67,016 | A | * | 7/1867 | Belmer et al. | ......... | A01K 25/00 |
| | | | | | | 119/832 |
| 545,207 | A | * | 8/1895 | Miller | ..................... | A01K 25/00 |
| | | | | | | 119/832 |
| 1,068,971 | A | * | 7/1913 | Brauer | ................... | A01K 25/00 |
| | | | | | | 119/832 |
| 1,401,848 | A | * | 12/1921 | Williams | ............... | A01K 25/00 |
| | | | | | | 119/828 |

(Continued)

FOREIGN PATENT DOCUMENTS

| DE | | 390110 C | * | 2/1924 | ............. | A01K 25/00 |
| DE | | 4231689 A1 | * | 3/1994 | ............. | A01K 25/00 |

(Continued)

OTHER PUBLICATIONS

International Search Report and Written Opinion for corresponding Application No. PCT/GB2015/053160 (dated Dec. 23, 2015).

(Continued)

*Primary Examiner* — Lisa L Tsang
(74) *Attorney, Agent, or Firm* — Troutman Pepper Hamilton Sanders LLP (Rochester)

(57) ABSTRACT

An animal halter comprising a muzzle. The animal halter comprises a nose band having two ends, a muzzle which is attached to or integral with the nose band, and a lead attachment loop slidably attached to each of the ends of the nose band, wherein in use, tension on the lead attachment loop causes the two ends of the nose band to come together and constrict around the nose of an animal.

11 Claims, 2 Drawing Sheets

(56) References Cited

U.S. PATENT DOCUMENTS

| | | | |
|---|---|---|---|
| 1,543,960 A * | 6/1925 | Tobin | A01K 13/006 |
| | | | 119/831 |
| 3,308,791 A | 3/1967 | D'Elia | |
| 4,337,610 A | 7/1982 | Taylor | |
| 4,483,275 A * | 11/1984 | De Groot | A01K 27/00 |
| | | | 119/793 |
| 4,741,288 A | 5/1988 | Anderson et al. | |
| 5,038,717 A | 8/1991 | Bent | |
| 5,267,529 A | 12/1993 | Zelinger | |
| 5,992,352 A * | 11/1999 | Borchelt | A01K 25/00 |
| | | | 119/831 |
| D458,717 S * | 6/2002 | Mugford | A01K 27/00 |
| | | | D30/152 |
| 7,690,332 B1 | 4/2010 | Merbeth | |
| 7,930,997 B2 * | 4/2011 | Ashby | A01K 27/002 |
| | | | 119/831 |
| 8,220,419 B2 | 7/2012 | Mitton | |
| 2002/0073936 A1 * | 6/2002 | Fields-Babineau | A01K 25/00 |
| | | | 119/863 |
| 2013/0112154 A1 | 5/2013 | Sheridan | |

FOREIGN PATENT DOCUMENTS

| | | | | |
|---|---|---|---|---|
| DE | 29803668 U1 * | 7/1998 | | A01K 27/00 |
| FR | 371425 A * | 3/1907 | | A01K 25/00 |
| GB | 327850 A | 4/1930 | | |
| GB | 533259 A * | 2/1941 | | A01K 25/00 |
| GB | 2224626 A | 5/1990 | | |
| GB | 2246278 A | 1/1992 | | |
| GB | 2327850 A | 10/1999 | | |
| GB | 2489200 A * | 9/2012 | | A01K 27/00 |
| GB | 2489200 A | 9/2012 | | |

OTHER PUBLICATIONS

Search Report for corresponding Application No. GB 1419207.4 (dated Mar. 17, 2016).

* cited by examiner

ANIMAL HALTER

This application is a national stage application under 35 U.S.C. § 371 of PCT Application No. PCT/GB2015/053160, filed Oct. 22, 2015, which claims the priority benefit of Great Britain Patent Application No. 1419207.4, filed Oct. 29, 2014.

FIELD OF THE INVENTION

The present invention relates to an animal halter, particularly an animal halter comprising a muzzle.

BACKGROUND TO THE INVENTION

When training animals to walk on the lead or rope, it is desirable that the animals are trained not to pull in reaction to being held by the handler. Pulling can put the handler off balance and mean that the animal is out of control. Various types of constricting halters have been designed which have a lead attachment position under the chin or around the head to counteract this. It is consequently much harder for the animal to pull against the lead as the force is transmitted through the head rather than directly through the neck or legs, as in conventional neck collars/harnesses. Examples of such halters include those described in GB2489200 and WO2004054355. These devices all have a nose band which extends around the nose and mouth of the animal. In use a lead or rope is attached to a ring and/or loop under the chin. The lead or rope is held by the handler. The nose band is adapted to constrict and when the animal pulls away from the handler, the nose band is tightened around the nose of the animal. This not only stops the halter from rotating around the head of the animal, but gives the handler greater control. In trying to pull away from the handler the head is drawn towards the handler and the animal is prevented from pulling.

In some circumstances however, animals are required to be muzzled whilst being handled, perhaps for safety reasons, but also because of legal requirements in some countries. Existing muzzles which fit around the nose of the animal are unsuitable for use with the halters that have a lead attachment point under the jaw of the animal because the muzzle along with its head and neck straps interfere with this connection point. Furthermore, with constriction halters, the application of a muzzle interferes with the tightening of the nose loop around the nose of the animal. Furthermore, the constriction halters noted above have no facility to prevent the halter from riding up the side or twisting around the dog's head as the dog pulls. This further makes these halters unsuitable for use with muzzles.

There has now been developed an animal halter which overcomes or substantially mitigates the above-mentioned and/or other disadvantages associated with the prior art.

SUMMARY OF THE INVENTION

In a first aspect of the invention there is provided an animal halter comprising, a nose band having two ends, a muzzle which is attached to or integral with the nose band, and a lead attachment loop slidably attached to each of the ends of the nose band, wherein in use, tension on the lead attachment loop causes the two ends of the nose band to come together and constrict around the nose of an animal.

The constriction of the nose band around the nose of the animal in use gives greater control to the handler and helps to prevent the halter from twisting around the head of the animal. Thus the halter stops the animal from pulling away from a handler. Advantageously, the animal can be muzzled whilst also being restrained in this manner with the halter of the invention. As the halter does not twist around the head of the animal in use neither does the muzzle twist around the nose of the animal. Thus the muzzle maintains its functionality.

For the purposes of this document the term "ring" encompasses any means which is suitable for holding any strap, loop or band captive while permitting said straps, loops or bands to run substantially freely through said means.

The animal halter according to the invention is particularly suitable for use with a canine. Preferably the animal is a canine. However the animal halter may also be used with other types of animal having a muzzle or snout.

The halter preferably comprises a neck band for the attachment of the halter to the head of the animal. The neck band may comprise an adjustment means. Said adjustment means preferably enables the length of the neck band to be altered. The neck band may also comprise joining and separating means to allow the neck band to be placed around the animal's head and removed from the animal's head. Similar adjustment and/or joining and separating means may also be present on the lead attachment loop or the nose band to alter the length of said loops and bands or to allow temporary disconnection and reattachment.

The muzzle preferably forms the general shape of a frusto-conical cone. The muzzle comprises a central opening adapted to receive the nose or snout of the animal. The muzzle has an apex which surrounds the farthest extremity of the nose or snout in use. The muzzle may comprise perforations in order to allow for breathing and/or drinking water. The muzzle is preferably made from a bite resistant material.

Preferably the muzzle is functionally cooperative with the nose band. Thus, when the nose band constricts so does the muzzle, and when the nose band relaxes so does the muzzle. In other words, the muzzle does not prevent the nose band from constricting or relaxing, or vice versa. The muzzle also maintains its functionality (as a muzzle) during the constriction and relaxation which means that there is no chance that the mouth of the animal could extend outside the confines of the muzzle, or that the animal could bite through the muzzle during use. In so doing a close fit of the muzzle around the animal's nose is maintained at all times, and as the nose band constricts around the nose of the animal, both the halter and the muzzle are prevented from rotating around the nose or shifting position uncontrollably (which would be uncomfortable to the animal).

The muzzle may be attached to the nose band by a plurality of attachment means. Any one of the plurality of the attachment means may be slidable or fixed around either or both the nose band or the central opening of the muzzle. This can provide the functional cooperation described above.

The muzzle may be integral with nose band by being formed or the same material as the nose band. Thus, the muzzle may define a portion of the nose band. This can provide the functional cooperation described above. The nose band may be integral with a central opening of the muzzle. In order that the muzzle is functionally cooperative with the nose band the muzzle may also be made of a flexible material or comprise attachment means which are flexible to allow for movement between the nose band and the muzzle.

The attachment means may be straps, buckles, clips, rings, fastenings or the like. Attachment means encompasses any means which is suitable for holding captive the muzzle to the halter or to the nose band.

The neck band may be connected at one end to a first ring and at the other end to the second ring. A lower cheek strap may be connected at one end to the first and at the other end to a third ring. A similar lower cheek strap may be similarly connected on the opposing side of the halter at one end to the second ring and at the other end to the fourth ring. The nose band may be connected at one end to the third ring and at the other end to the fourth ring. An upper cheek strap may be connected one end to the first ring and at the other end to a portion of the nose band proximal the third ring. A similar upper cheek strap may be similarly connected on the opposing side of the halter at one end to the second ring and at the other end to a portion of the nose band proximal the fourth ring. Preferably the upper cheek straps and the lower cheek straps hold the nose band in a substantially fixed orientation with respect to the neck band and the animal during use.

A throat strap may be connected at one end to the first ring and at the other end to the second ring. A chin strap may be connected at one end to the lead attachment loop and at the other end to the throat strap. The throat strap and the chin strap preferably hold the nose band in a substantially fixed orientation with respect to the neck band and the animal during use. The throat strap and the chin strap also preferably maintain the separation of the two sides of the halter during use. The throat strap and the chin strap preferably ensure that the halter does not twist around the animal's head during use. The throat strap and the chin strap preferably also ensure that the halter does not ride up the side of the animal's face at all.

Each of the straps, bands, loops or attachment means described in the present invention may be made of woven or non-woven polymeric material, leather or natural fibrous material, or combinations thereof. Each of the straps, bands, loops or adjustment means may be glued, stitched, bonded, riveted or otherwise jointed in order to connect with other rings, straps, bands, loops, or adjustment means.

Each of the rings described above may be made of metal, polymer or leather, or combinations thereof.

It will be appreciated that the animal halter according to the invention is particularly useful in animal restraint and preventing animals from pulling. Therefore, in a second aspect of the invention there is provided an animal restraint comprising the animal halter according to the invention.

A preferred embodiment of the invention will now be described in greater detail, by way of illustration, with reference to the accompanying drawings.

DETAILED DESCRIPTION OF THE ILLUSTRATED EMBODIMENT

Figure 1:
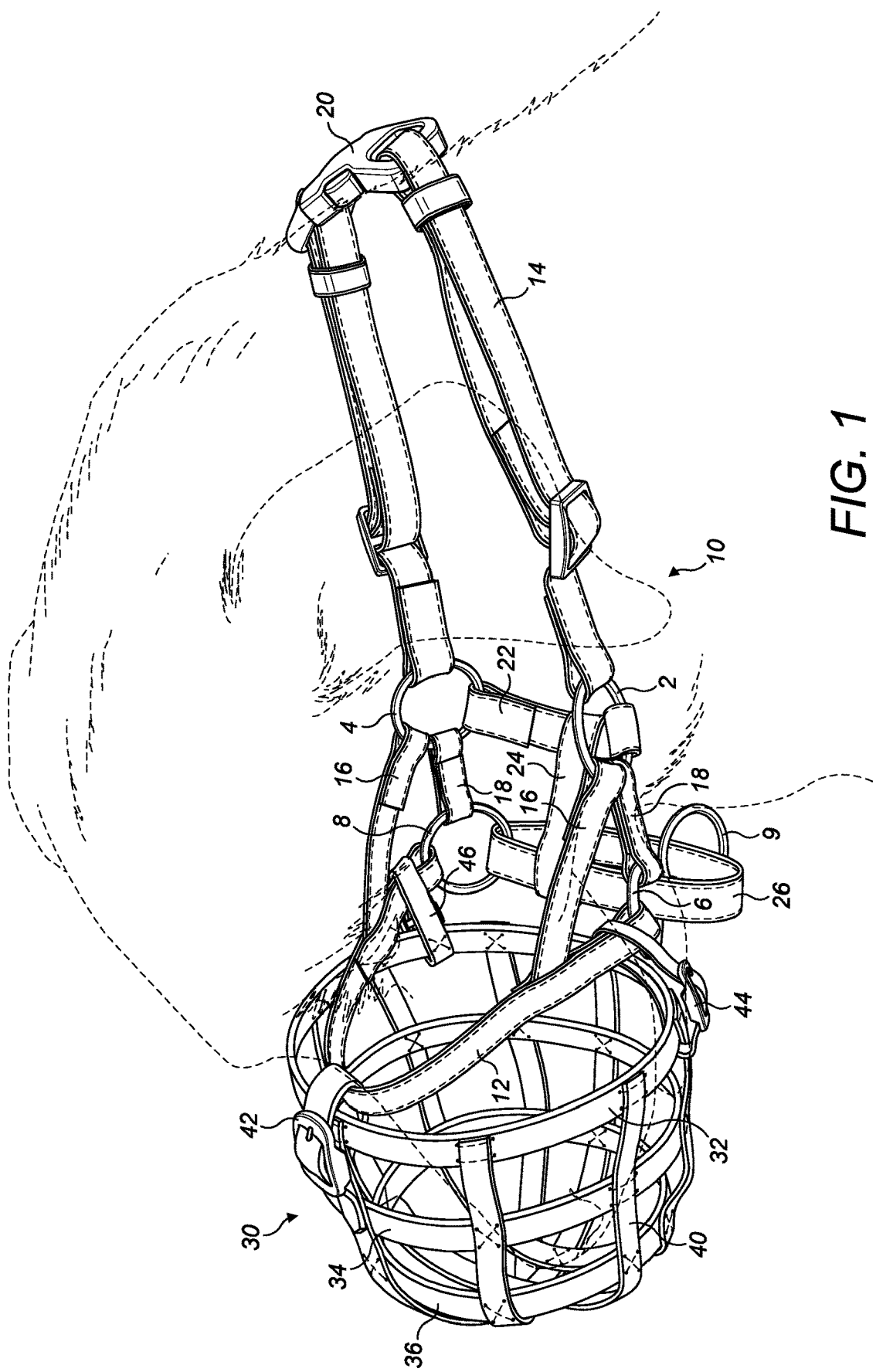
FIG. 1 is a perspective view of an embodiment of the invention wherein the halter is fitted around the head of a dog.

The halter 10 as shown in FIG. 1 is particularly suitable for a dog. The halter 10 comprises a nose band 12 and a neck band 14. The neck band 14 is connected at one end to the ring 2 and at the other end to the ring 4. The neck band 14 comprises an adjustable buckle 20 which enables the length of the neck band 14 to be altered. The adjustable buckle 20 is provided also to allow the halter to be placed around and removed from a dog's head. A lower cheek strap 18 is connected at one end to the ring 2 and at the other end to a ring 6. A similar lower cheek strap 18 is similarly connected on the opposing side of the halter at one end to the ring 4, and at the other end to the ring 8. The nose band 12 is connected at one end to the ring 6 and at the other end to the ring 8. An upper cheek strap 16 is connected at one end to the ring 2 and at the other end to a portion of the nose band 12 proximal the ring 6. A similar upper cheek strap 18 is similarly connected on the opposing side of the halter at one end to the ring 4, and at the other end to a portion of the nose band 12 proximal the ring 8. The upper cheek straps 16 and the lower cheek straps 18 hold the nose band 12 in a substantially fixed orientation with respect to the neck band 14.

A throat strap 22 is connected at one end to the ring 4 and at the other end to the ring 2. A chin strap 24 is connected at one end to a lead attachment loop 26 and at the other end to the central portion of the throat strap 22. The chin strap 24 therefore extends substantially perpendicular to the throat strap 22. The throat strap 22 and the chin strap 24 further contribute towards holding the nose band 12 in a substantially fixed orientation with respect to the neck band 14. The throat strap 22 and the chin strap 24 also maintain the separation of the two sides of the halter 10 ensuring that in use the halter 10 does not twist around the animal's head or ride up to the eyes. The lead attachment loop 26 is a continuous length of material and extends freely through the rings 6 and 8. The lead attachment loop 26 also extends through ring 9 which is not attached to any other part of the halter 10. The ring 9 allows for attachment of a lead. Advantageously, in this instance the point of lead attachment is separated by the lead attachment loop from the muzzle and therefore the muzzle and the lead do not interfere with each other.

Each of the rings 2, 4, 6, 8 and 9 are circular bands of stainless steel.

Each of the straps, bands and loops described in the above example are made of double thickness woven polymer fabric material. The two thicknesses of material are stitched along their length to keep the two thicknesses together and prevent padding enclosed within each thickness from escaping. At the point of connection of the bands or straps to the rings, the material is looped through the ring and stitched back onto itself. At the connection of the upper cheek straps 16 with the nose band 12, the two parts are joined by stitching. At the connection of the chin strap 24 with the lead attachment loop 26, the two parts are joined by stitching. At the connection of the chin strap 24 with the throat strap 22, the end of the chin strap 24 is looped around the throat strap 22 and stitched back on itself. The chin strap 24 is therefore able to move along the throat strap 22 between the rings 2 and 4.

At the front (snout end) of the halter 10 there is a muzzle 30. The muzzle 30 is made of similar material to the main body of the halter. The muzzle 30 comprises an opening loop 32 which extends around the circumference of the opening to the muzzle 30. Two further loops 34 and 36 are positioned forward of the opening loop 32. Both loops 34 and 36 extend circumferentially, however the diameter of loop 34 is less than the diameter of loop 32, and the diameter of loop 36 is less than that of loop 34. The loops 34 and 36 are held apart separated from one another by a plurality of straps 40 (and 41 on FIG. 2) each of which have one end attached to the opening loop 32 and another end attached to the opening loop 32 but at a diametrically opposed position on the loop. All of the points where the loops and straps cross over in the muzzle are stitched together. Consequently the muzzle forms a substantially frusto-conical shape with an apex where all the straps converge. A plurality of four sided holes are created defined by the crossover of the loops and straps. This allows the animal to inhale and exhale through the muzzle. The opening loop 32 has three buckles 42, 44, and 46 equally spaced around the circumference of the opening loop 32. Buckle 42 is connected by stitching to the opening loop of the muzzle and is unable to move around the rim of the opening loop 32. Buckles 44 and 46 are connected to the opening loop, but are moveable slidably around the rim of the opening loop. The muzzle 30 is connected to the halter 10 by connecting buckles 44 and 46 to the strap 12. The buckles fit in the gap between the two cheek straps (16 and 18) but around strap 12 (ie above rings 6 and 8). Buckles 44 and 46 are moveable slidably around the rim of the opening loop 32 and the strap 12. Buckle 42 is connected around the nose band 12 at the uppermost part of the nose band 12 and is moveable slidably around the rim of the nose band 12.

In use, the halter 30 is offered up to the dog's head. The adjustable buckle 20 is opened and the halter 30 is placed over the dog's head, the dog's nose passing through the space created by the nose band and through the opening loop 32 of the muzzle. The adjustable buckle is then closed and adjusted so that the neck band is tightened around the back of the dog's neck below the ears. Thus the throat strap 22 and chin strap 24 are positioned under the throat and chin of the dog, respectively, the cheek straps 16 and 18 are positioned around the cheeks, and the lead attachment loop 26 hangs down below the mouth of the dog. The dotted lines on the drawing indicate the approximate position of the dog's head within the halter.

A lead is attached to the ring 9 and the dog is led from said ring by a handler. When the dog pulls away from the handler (or vice versa), tension is applied through the ring 9 to the lead attachment loop 26. In so doing the lead attachment loop 26 tightens to form a more elongate shape. This causes the rings 6 and 8 to be pulled closer towards each other and closer against the dog. The cheek, throat and chin straps prevent the rings 6 and 8 from riding up the side of the dog's head, and maintain them in a substantially consistent orientation and position with respect to the dog's head. Thus, the muzzle 30 is maintained in the correct orientation around the nose as well. As the rings 6 and 8 are pulled closer towards each other they are tightened along with the nose band around the nose and mouth of the dog, which increases the pressure on the nose band and this ensures that the dog cooperates with the handler in a kind and controlled manner. The muzzle 30 cooperates with the movement of the nose band 12 and rings 6 and 8. In this position also, as the point of lead attachment is separated from the muzzle by the lead attachment loop, the animal can still be controlled from a number of different angles using a lead, without the possibility that the halter or muzzle will be forced to ride up the side of the head of the animal. The nose band 12 is not prevented from tightening around the nose of the dog by the muzzle because the buckles 42, 44 and 46 are moveable slidably around the rim of the nose band 12. When the dog relaxes the strain on the lead attachment loop 26 is reduced and it returns to its more circular orientation, as shown in the FIG. 1. The rings 8 and 6 are allowed to part, for example when the dog opens its mouth. This releases the pressure on the nose band.

Although described with respect to a dog, it will be appreciated that the halter 10 would be suitable for use with other types of animal having a muzzle or snout.

Figure 2:
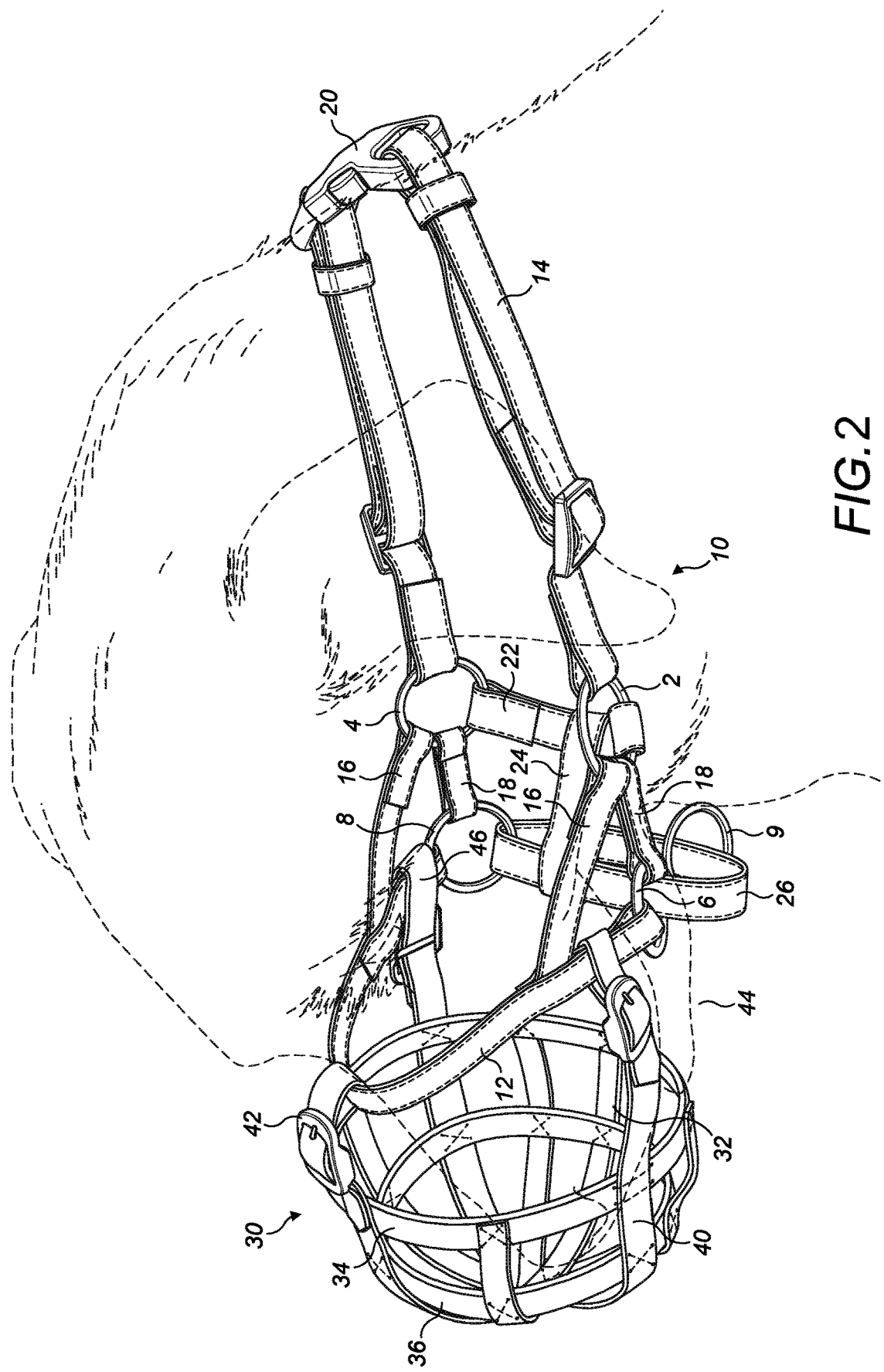
FIG. 2 is a perspective view of a further embodiment of the invention.

The halter 10 as shown in FIG. 2 is also particularly suitable for a dog. In the embodiment shown in FIG. 2, the loop 32 has been removed from the muzzle 30, so that the muzzle is only covering the front part of the nose. This is less interfering for the dog and provides a more comfortable arrangement. As part of this alteration, the length of the buckles 42, 44 and 46 and the straps that connect them to the muzzle loop 34 have been increased, so overall the distance from the nose band 12 and the end of the muzzle is the same as for the embodiment shown in FIG. 1. This provides greater flexibility in the connection between the muzzle and the nose loop. Thus the nose loop 12 is even less likely to be prevented from constricting when force is applied through the ring 9 on to the loop 26. The only other alteration is that the lateral bands 41 terminate at the loop 34. The halter 10 is otherwise substantially the same as described above.

The invention claimed is:

1. An animal halter comprising:
   a nose band having two ends coupled to a first attachment ring and a second attachment ring, respectively;
   a lead attachment loop slidably attached to each of the ends of the nose band by the first and second attachment rings; and
   a muzzle shaped as a frusto-conical cone configured to entirely contain the snout of an animal during use, the muzzle being perforated, constructed of a flexible material, and attached to the nose band by a plurality of attachment mechanisms at locations between the first attachment ring and the second attachment ring, each attachment mechanism being slidably moveable along a portion of a length of the nose band between the first attachment ring and the second attachment ring such that, in use, the muzzle is functionally cooperative with the nose band so that tension on the lead attachment loop causes: (i) the two ends of the nose band to come together and constrict around the snout of the animal, and (ii) the muzzle to constrict around the snout of the animal, wherein the plurality of attachment mechanisms are attached only to the nose band and the muzzle.

2. The animal halter according to claim 1, wherein the animal halter is configured for use on a canine.

3. The animal halter according to claim 1, comprising a neck band for attachment of the halter to the head of the animal.

4. The animal halter according to claim 3, wherein the neck band comprises an adjustment means.

5. The animal halter according to claim 3, wherein the neck band comprises joining and separating means to allow the neck band to be placed around the animal's head and removed from the animal's head.

6. The animal halter according to claim 1, wherein upper cheek straps and lower cheek straps, on opposing sides of the halter, hold the nose band in a fixed orientation with respect to the neck band and the animal during use.

7. The animal halter according to claim 1, wherein a throat strap and a chin strap hold the nose band in a fixed orientation with respect to the neck band and the animal during use.

8. The animal halter according to claim 1, wherein a throat strap and a chin strap maintain a separation of two sides of the halter during use.

9. The animal halter according to claim 1, wherein a throat strap and a chin strap ensure that the halter does not twist around the animal's head during use.

10. The animal restraint comprising the animal halter according to claim 1.

11. An animal halter comprising:
a nose band having two ends coupled to a first attachment ring and a second attachment ring, respectively;
a lead attachment loop slidably attached to each of the ends of the nose band by the first and second attachment rings; and
a muzzle configured to entirely contain the snout of an animal during use, the muzzle being perforated, constructed of a flexible material, and attached to the nose band by a plurality of attachment mechanisms at locations between the first attachment ring and the second attachment ring, each attachment mechanism being slidably moveable along a portion of a length of the nose band between the first attachment ring and the second attachment ring such that, in use, the muzzle is functionally cooperative with the nose band so that tension on the lead attachment loop causes: (i) the two ends of the nose band to come together and constrict around the snout of the animal, and (ii) the muzzle to constrict around the snout of the animal, wherein the plurality of attachment mechanisms are attached only to the nose band and the muzzle.

\* \* \* \* \*